United States Patent
Zhou et al.

(10) Patent No.: US 12,143,925 B2
(45) Date of Patent: Nov. 12, 2024

(54) TECHNIQUES FOR MULTIPLEXING RESTRICTION RELAXATION FOR FULL DUPLEX COMMUNICATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/649,234

(22) Filed: Jan. 28, 2022

(65) Prior Publication Data
US 2023/0247532 A1    Aug. 3, 2023

(51) Int. Cl.
| | |
|---|---|
| *H04W 48/16* | (2009.01) |
| *H04L 5/00* | (2006.01) |
| *H04L 5/14* | (2006.01) |
| *H04W 24/10* | (2009.01) |
| *H04W 56/00* | (2009.01) |

(52) U.S. Cl.
CPC ......... *H04W 48/16* (2013.01); *H04L 5/0051* (2013.01); *H04L 5/14* (2013.01); *H04W 24/10* (2013.01); *H04W 56/001* (2013.01)

(58) Field of Classification Search
CPC .. H04B 1/7075; H04W 72/54; H04W 56/001; H04W 24/10; H04W 48/16; H04L 5/0051; H04L 5/14
See application file for complete search history.

(56) References Cited

U.S. PATENT DOCUMENTS

| | | | |
|---|---|---|---|
| 6,981,054 B1* | 12/2005 | Krishna | H04L 47/29 370/414 |
| 2008/0218360 A1* | 9/2008 | Nekoda | H04L 43/0817 340/584 |
| 2011/0047446 A1* | 2/2011 | Fukuyama | H04L 5/1438 714/E11.032 |
| 2015/0223173 A1* | 8/2015 | Khojastepour | H04W 52/14 370/278 |
| 2017/0041165 A1* | 2/2017 | Cheng | H04L 1/00 |
| 2018/0192357 A1* | 7/2018 | Fodor | H04W 36/304 |
| 2019/0104544 A1* | 4/2019 | Axnäs | H04W 72/0446 |
| 2019/0364596 A1* | 11/2019 | Axn?S | H04W 72/0453 |
| 2020/0107202 A1* | 4/2020 | Teng | H04L 5/14 |
| 2020/0228196 A1* | 7/2020 | Wilson et al. | H04W 72/23 |
| 2020/0337057 A1* | 10/2020 | Abedini | H04W 8/24 |
| 2021/0176033 A1* | 6/2021 | Oteri | H04W 74/0816 |
| 2022/0109492 A1* | 4/2022 | Abedini | H04B 7/15528 |

(Continued)

*Primary Examiner* — Jenee Holland
(74) *Attorney, Agent, or Firm* — Dalei Dong; Harrity & Harrity, LLP

(57) ABSTRACT

Various aspects of the present disclosure generally relate to wireless communication. In some aspects, a wireless communication device may identify one or more multiplexing restriction parameters for communication in a wireless network. The wireless communication device may determine to ignore the one or more multiplexing restriction parameters for full duplex communication in the wireless network. The wireless communication device may communicate in a full duplex communication mode based at least in part on the determination to ignore the one or more multiplexing restriction parameters. Numerous other aspects are described.

30 Claims, 7 Drawing Sheets

(56) References Cited

U.S. PATENT DOCUMENTS

| | | | |
|---|---|---|---|
| 2023/0133900 A1* | 5/2023 | Zhang .................. | H04W 72/12 370/277 |
| 2023/0284155 A1* | 9/2023 | Shim .................... | H04W 84/04 370/329 |

* cited by examiner

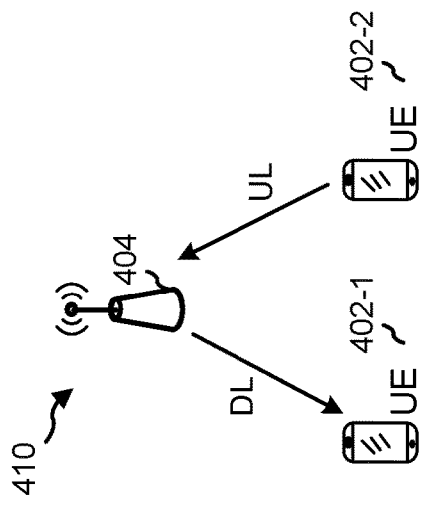
FIG. 4B
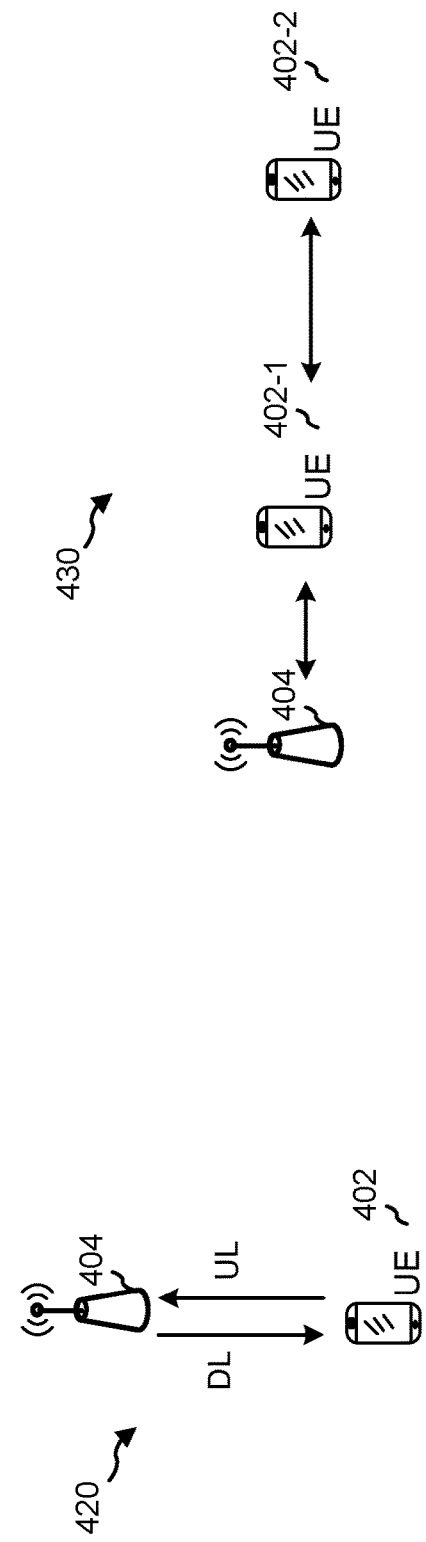
FIG. 4D
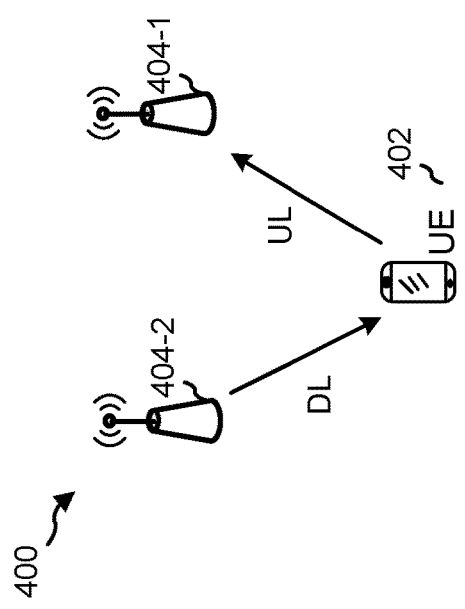
FIG. 4A
FIG. 4C

TECHNIQUES FOR MULTIPLEXING RESTRICTION RELAXATION FOR FULL DUPLEX COMMUNICATION

FIELD OF THE DISCLOSURE

Aspects of the present disclosure generally relate to wireless communication and to techniques and apparatuses for multiplexing restriction relaxation for full duplex communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include identifying one or more multiplexing restriction parameters for communication in a wireless network. The method may include determining to ignore the one or more multiplexing restriction parameters for full duplex communication in the wireless network. The method may include communicating in a full duplex communication mode based at least in part on the determination to ignore the one or more multiplexing restriction parameters.

Some aspects described herein relate to a wireless communication device for wireless communication. The wireless communication device may include a memory and one or more processors coupled to the memory. The one or more processors may be configured to identify one or more multiplexing restriction parameters for communication in a wireless network. The one or more processors may be configured to determine to ignore the one or more multiplexing restriction parameters for full duplex communication in the wireless network. The one or more processors may be configured to communicate in a full duplex communication mode based at least in part on the determination to ignore the one or more multiplexing restriction parameters.

Some aspects described herein relate to a non-transitory computer-readable medium that stores a set of instructions for wireless communication by a wireless communication device. The set of instructions, when executed by one or more processors of the wireless communication device, may cause the wireless communication device to identify one or more multiplexing restriction parameters for communication in a wireless network. The set of instructions, when executed by one or more processors of the wireless communication device, may cause the wireless communication device to determine to ignore the one or more multiplexing restriction parameters for full duplex communication in the wireless network. The set of instructions, when executed by one or more processors of the wireless communication device, may cause the wireless communication device to communicate in a full duplex communication mode based at least in part on the determination to ignore the one or more multiplexing restriction parameters.

Some aspects described herein relate to an apparatus for wireless communication. The apparatus may include means for identifying one or more multiplexing restriction parameters for communication in a wireless network. The apparatus may include means for determining to ignore the one or more multiplexing restriction parameters for full duplex communication in the wireless network. The apparatus may include means for communicating in a full duplex communication mode based at least in part on the determination to ignore the one or more multiplexing restriction parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4D are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
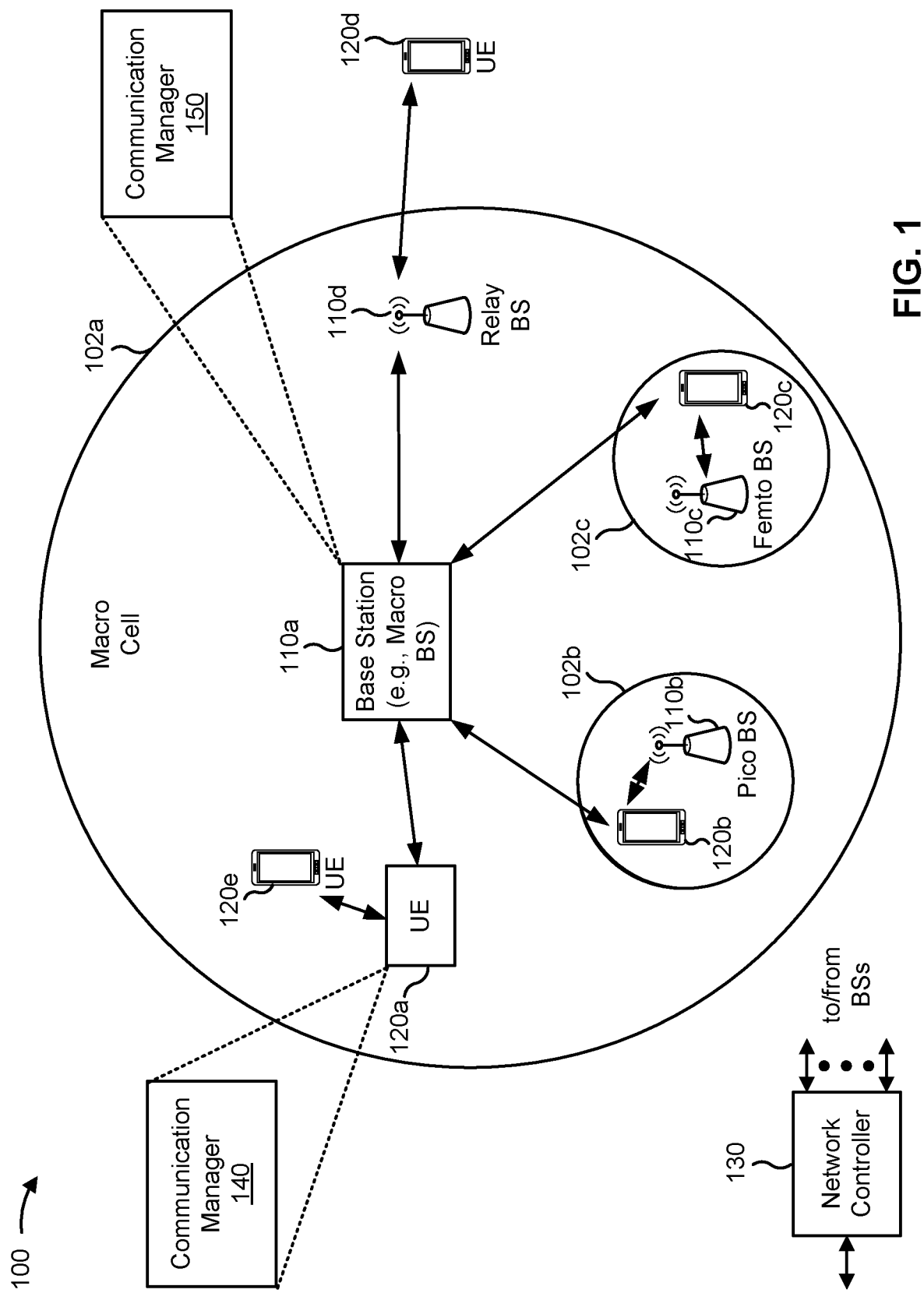
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used. Base stations 110 may be included in a radio access network (RAN) of the wireless network 100.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless communication device may include a communication manager 140 or a communication manager 150. As described in more detail elsewhere herein, the communication manager 140 and/or the communication manager 150 may identify one or more multiplexing restriction parameters for communication in a wireless network; determine to ignore the one or more multiplexing restriction parameters for full duplex communication in the wireless network; and communicate in a full duplex communication mode based at least in part on the determination to ignore the one or more multiplexing restriction parameters. Additionally, or alternatively, the communication manager 140 and/or the communication manager 150 may perform one or more other operations described herein.

As indicated above, FIG. 1 is provided as an example. Other examples may differ from what is described with regard to FIG. 1.

Figure 2:
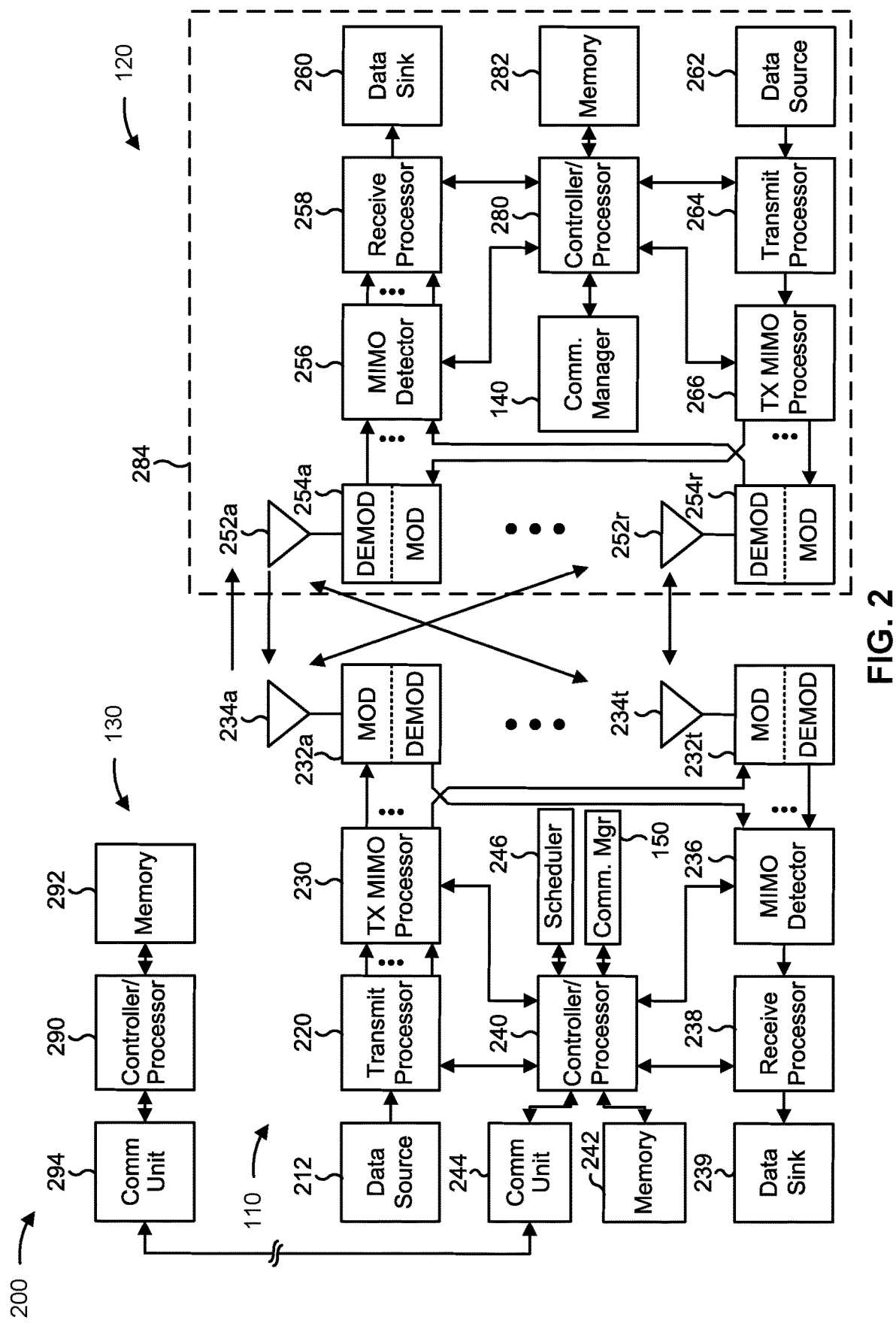
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with multiplexing restriction relaxation for full duplex communication, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, a wireless communication device (e.g., the base station 110, the UE 120) includes means for identifying one or more multiplexing restriction parameters for communication in a wireless network; means for determining to ignore the one or more multiplexing restriction parameters for full duplex communication in the wireless network; and/or means for communicating in a full duplex communication mode based at least in part on the determination to ignore the one or more multiplexing restriction parameters. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
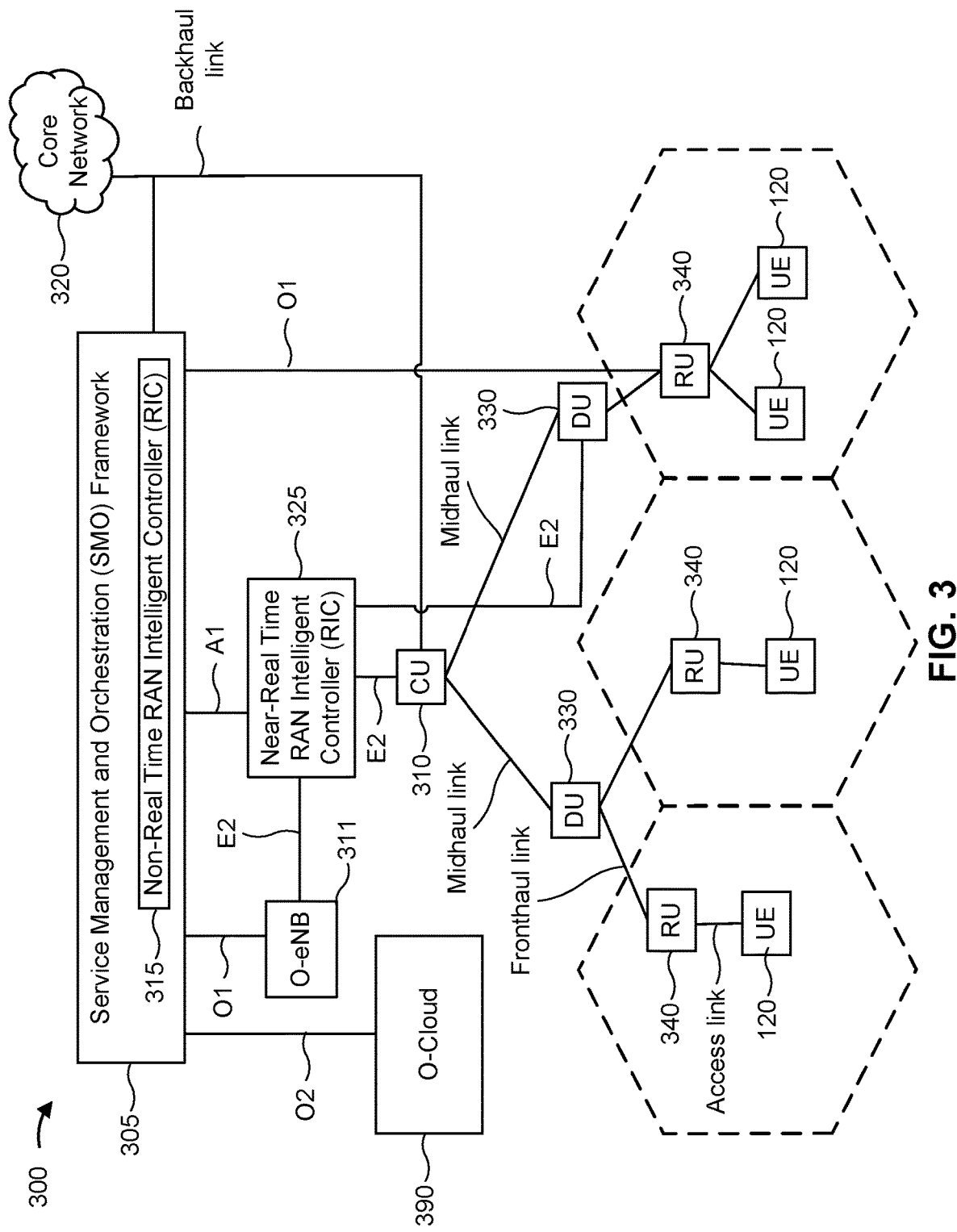
FIG. 3 is a diagram illustrating an example 300 of an open radio access network (O-RAN) architecture, in accordance with the present disclosure.

FIG. 3 is a diagram illustrating an example of a disaggregated base station architecture 300. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (i.e., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

FIGS. 4A-4D are diagrams illustrating examples 400, 410, 420, and 430 of full duplex (FD) communication, in accordance with the present disclosure. In the examples illustrated in FIGS. 4A-4D, a wireless communication device such as a UE and/or a base station may communicate in a full duplex communication mode. In a full duplex communication mode, a wireless communication device may be capable of simultaneous transmission and reception (e.g., in the same time domain resources and/or in the same frequency domain resources). Accordingly, a wireless communication device may transmit a communication while receiving another communication in a full duplex communication mode.

As described above, a UE and/or a base station may communicate in a full duplex communication mode. For example, a UE may communicate in a full duplex communication mode in which the UE transmits uplink communications using a first antenna (or a first antenna panel or array) while receiving downlink communications using a second antenna (or a second antenna panel or array), where sufficient spatial separation is provided between the beams used for transmission and reception to reduce and/or minimize interference and/or clutter echo. As another example, a base station may communicate in a full duplex communication mode in which the base station transmits downlink communications using a first antenna (or a first antenna panel or array) while receiving uplink communications using a second antenna (or a second antenna panel or array), where sufficient spatial separation is provided between the beams used for transmission and reception to reduce and/or minimize interference and/or clutter echo.

Full duplex communication may provide reduced latency in wireless communications, as communications can be received and transmitted simultaneously as opposed to sequentially. Moreover, full duplex communication may provide increased wireless spectrum usage efficiency and increased wireless resource utilization in that transmission and reception is enabled in the same time domain resources and in the same frequency domain resources. Full duplex communication may also provide increased wireless network coverage.

The example 400 of FIG. 4A includes a UE 402 and two base stations (e.g., base stations 110, TRPs, DUs 330, RUs 340) 404-1, 404-2, where the UE 402 is sending uplink transmissions to base station 404-1 and is receiving downlink transmissions from base station 404-2. In the example 400 of FIG. 4A, full duplex communication is enabled for the UE 402 (e.g., such that the UE 402 operates in a full duplex communication mode), but not for the base stations

404-1, 404-2. The example 400 includes an example of a multi-TRP (mTRP) deployment in the wireless network 100.

The example 410 of FIG. 4B includes two UEs, shown as UE 402-1 and UE 402-2, and a base station 404, where the UE 402-1 is receiving a downlink transmission from the base station 404 and the UE 402-2 is transmitting an uplink transmission to the base station 404. In the example 410 of FIG. 4B, full duplex communication is enabled for the base station 404 (e.g., such that the base station 404 operates in a full duplex communication mode), but not for UE 402-1 and UE 402-2. The example 410 may be implemented in an integrated access and backhaul (IAB) deployment in the wireless network 100.

The example 420 of FIG. 4C includes a UE 402 and a base station 404, where the UE 402 is receiving a downlink transmission from the base station 404 and the UE 402 is transmitting an uplink transmission to the base station 404. In the example 420 of FIG. 4C, full duplex communication is enabled for both the UE 402 and the base station 404 (e.g., such that both the UE 402 and the base station 404 operate in a full duplex communication mode).

The example 430 of FIG. 4D includes two UEs, shown as UE 402-1 and UE 402-2, and a base station 404. In the example 430, the UE 402-1 operates in a full duplex communication mode as a relay UE by forwarding traffic (e.g., wireless communications) between the UE 402-1 and a base station 404. For example, the UE 402-1 may receive a DL transmission from the base station 404 while forwarding another DL transmission to UE 402-2. As another example, the UE 402-1 may transmit a UL transmission to the base station 404 while receiving another UL transmission from the UE 402-2.

As indicated above, FIGS. 4A-4D are provided as one or more examples. Other examples may differ from what is described with regard to FIGS. 4A-4D.

In some cases, restrictions may be configured for a wireless communication device (e.g., a UE, a base station) on multiplexing various types of communications and/or actions in a wireless network. Examples include multiplexing control channel and shared channel communications, multiplexing communication receipt or transmission along with reference signal measurement, and/or multiplexing communication reception and reference signal transmission, among other examples. These multiplexing restriction parameters may prevent a wireless communication device from being scheduled or configured to perform actions in the wireless network that the wireless communication device may not be capable of simultaneously performing.

However, for wireless communication devices that are capable of simultaneously performing transmission and reception, and are otherwise restricted by multiplexing restriction parameters, these multiplexing restriction parameters may reduce the operation efficiency and performance of the wireless communication devices. For example, multiplexing restriction parameters may prevent a wireless communication device from utilizing full duplex communication where the wireless communication device is capable of full duplex communication. This can prevent the wireless communication device from realizing reduced latency, increased wireless spectrum usage efficiency, and increased wireless resource utilization provided by full duplex communication.

Some aspects described herein provide techniques for multiplexing restriction relaxation for full duplex communication. In some aspects, a wireless communication device (e.g., a base station 110, a UE 120, a DU 330, an RU 340, a UE 402, a base station 404, a wireless communication device 502, and/or other examples) may relax adherence to or ignore one or more multiplexing restriction requirements in a wireless network where the wireless communication device is configured to operate in a full duplex communication mode in the wireless network. Relaxing adherence to or ignoring the one or more multiplexing restriction requirements enables the wireless communication device to achieve reduced latency, increased wireless spectrum usage efficiency, increased wireless resource utilization, and/or other performance enhancements provided by full duplex communication.

Figure 5:
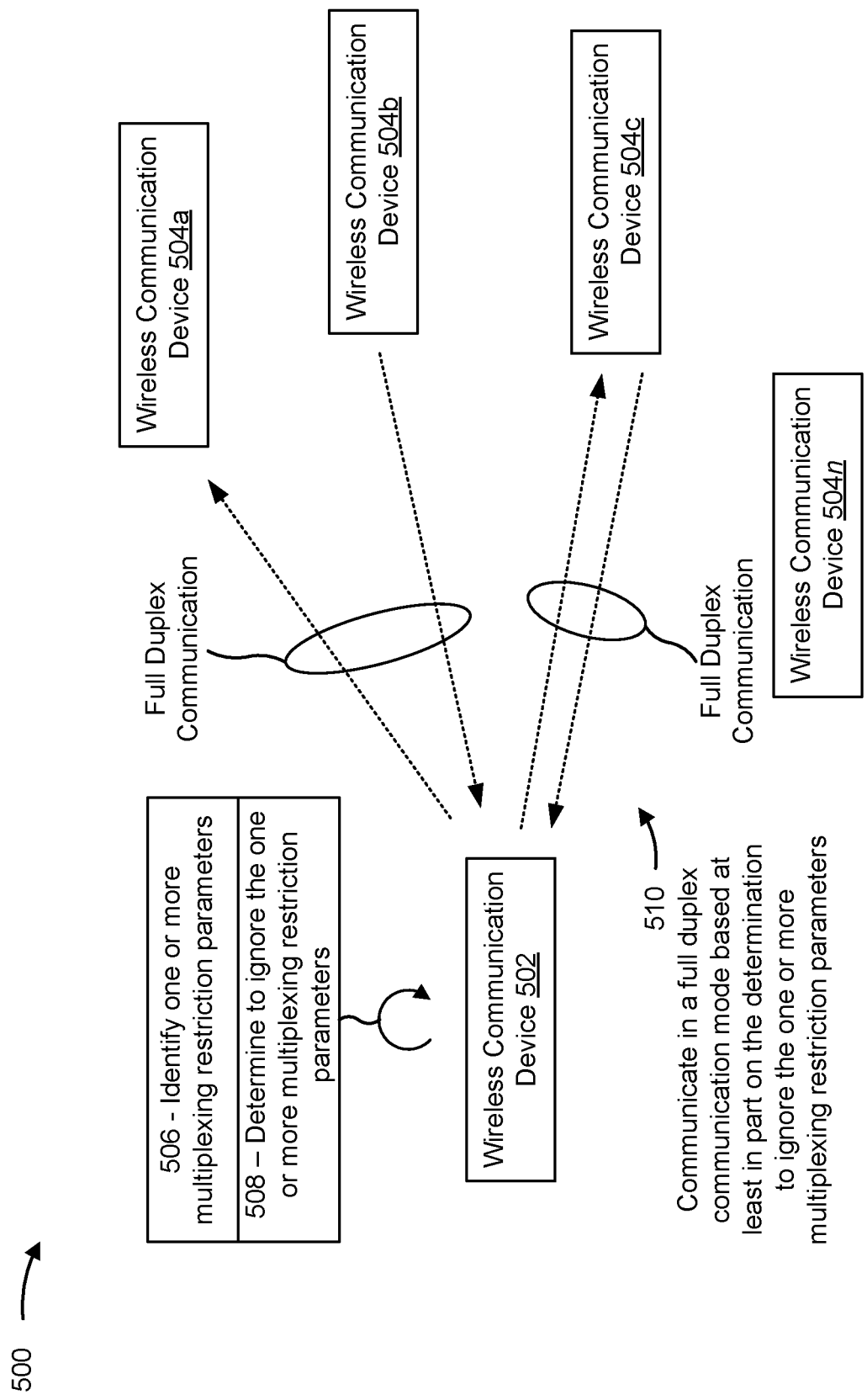
FIG. 5 is a diagram illustrating an example of multiplexing restriction relaxation for full duplex communication, in accordance with the present disclosure.

FIG. 5 is a diagram illustrating an example 500 of multiplexing restriction relaxation for full duplex communication, in accordance with the present disclosure. As shown in FIG. 5, the example 500 may include communication between a wireless communication device 502 and one or more wireless communication devices 504a-504n. The wireless communication device 502 and/or the wireless communication devices 504a-504n may be included in a wireless network, such as the wireless network 100. The wireless communication device 502 and/or the wireless communication devices 504a-504n may communicate on an uplink, a downlink, a sidelink, and/or another type of wireless communication link in the wireless network.

The wireless communication device 502 and/or the wireless communication devices 504a-504n may be configured to operate in a full duplex communication mode, such as one or more of the full duplex communication modes described above in connection with FIGS. 4A-4D.

For example, the wireless communication device 502 may perform full duplex communication with the wireless communication device 504a and the wireless communication device 504b. Here, the full duplex communication scenario may include the example 400 of FIG. 4A (e.g., where the wireless communication device 502 includes a UE 402 and the wireless communication devices 504a and 504b include a base station 404-1 and 404-2, respectively), the example 410 of FIG. 4B (e.g., where the wireless communication device 502 includes a base station 404 and the wireless communication devices 504a and 504b include a UE 402-1 and 402-2, respectively), the example 430 of FIG. 4D (e.g., where the wireless communication device 502 includes a UE 402-1 (a relay UE) and the wireless communication devices 504a and 504b include a UE 402-2 and a base station 404, respectively), or another full duplex communication scenario.

As another example, the wireless communication device 502 may perform full duplex communication with the wireless communication device 504c. Here, the full duplex communication scenario may include the example 420 of FIG. 4A (e.g., where the wireless communication device 502 includes a UE 402 and the wireless communication device 504c includes a base station 404, or where the wireless communication device 502 includes a base station 404 and the wireless communication device 504c includes a UE 402), or another full duplex communication scenario.

As indicated above, multiplexing restriction parameters may be configured for a wireless communication device in a wireless network. For the wireless communication device 502 (which is configured to operate in a full duplex communication mode), the multiplexing restriction parameters may reduce the performance and efficiency enhancements provided by full duplex communication for the wireless communication device 502. Accordingly, the wireless communication device 502 may identify one or more multiplexing restriction parameters for the wireless communication device 502 (at 506) and may determine to ignore the one or more multiplexing restriction parameters (at 508). In this way, at 510, the wireless communication device 502 may take advantage of the performance and efficiency enhancements provided by full duplex communication (e.g., that would otherwise be restricted by the one or more multiplexing restriction parameters) by communicating with one or more of the wireless communication devices 504*a*-504*n* in a full duplex communication mode based at least in part on the determination to ignore the one or more multiplexing restriction parameters.

"Ignoring" a multiplexing restriction parameter, as used herein, refers to not following or refraining from following the multiplexing restriction parameter. "Ignoring" a multiplexing restriction parameter may be used interchangeably with "relaxing" the multiplexing restriction parameter. By ignoring a multiplexing restriction parameter, the wireless communication device 502 may communicate in a full duplex communication mode and may communicate using techniques that would be otherwise restricted by the multiplexing restriction parameter.

In some aspects, the wireless communication device 502 determines to ignore the one or more multiplexing restriction parameters based at least in part on the full duplex communication mode being enabled for the wireless communication device 502. In some aspects, the wireless communication device 502 determines to ignore the one or more multiplexing restriction parameters based at least in part on signaling (e.g., signaling including an indication to ignore the one or more multiplexing restriction parameters) received from a base station 110, a network controller 130 in a core network 320, a CU 310, a DU 330, an RU 340, a base station 404, and/or another network entity.

In some aspects, the wireless communication device 502 identifies the one or more multiplexing restriction parameters that are to be ignored based at least in part on signaling (e.g., signaling including an indication of the one or more multiplexing restriction parameters that are to be ignored) received from a base station 110, a network controller 130 in a core network 320, a CU 310, a DU 330, an RU 340, a base station 404, and/or another network entity. In some aspects, the wireless communication device 502 identifies the one or more multiplexing restriction parameters based at least in part on being configured with a list of the one or more multiplexing restriction parameters that are to be ignored when the full duplex communication mode is enabled for the wireless communication device 502.

In some aspects, the wireless communication device 502 ignores multiplexing restriction parameters (e.g., the same multiplexing restriction parameters) for all beams on which the wireless communication device 502 communicates. In some aspects, the wireless communication device 502 ignores multiplexing restriction parameters on a beam pair basis, where the wireless communication device 502 ignores one or more multiplexing restriction parameters for a particular beam pair (or for particular beam pairs) including an uplink beam and a downlink beam on which the wireless communication device 502 communicates. The beam pair(s) may include, for example, beam pair(s) on which the wireless communication device 502 communicates in the full duplex communication mode.

The one or more multiplexing restriction parameters may include multiplexing restriction parameters specified by or identified in one or more wireless communication standards, such as a 3GPP technical specification and/or another type of wireless communication standard. For example, the one or more multiplexing restriction parameters may be specified by or identified in a 3GPP RAN4 technical specification (e.g., a 3GPP technical specification for radio performance and protocol aspects such as TS 38.133), a 3GPP RAN1 technical specification (e.g., a 3GPP technical specification for the physical layer of the radio interfaces in a wireless network), and/or another wireless communication standard. These wireless communication standards may be modified or updated to include provisions for ignoring or relaxing the specified or identified multiplexing restriction parameters in full duplex communication scenarios, for example.

In some aspects, the one or more multiplexing restriction parameters include one or more multiplexing restriction parameters for restricting transmission or reception of an uplink transmission (or transmission or reception of a downlink transmission), in one or more symbols in which the wireless communication device 502 is to perform one or more reference signal measurements. The wireless communication device 502 may ignore (or relax) these multiplexing restriction parameter(s) and instead may transmit or receive an uplink transmission (or transmit or receive a downlink transmission), in one or more symbols in which the wireless communication device 502 performs one or more reference signal measurements.

In some aspects, the one or more multiplexing restriction parameters include one or more multiplexing restriction parameters for restricting transmission or reception of an uplink transmission (or transmission or reception of a downlink transmission) in one or more symbols in which the wireless communication device 502 is to perform one or more mobility reference signal measurements. The wireless communication device 502 may ignore (or relax) these multiplexing restriction parameter(s) and instead may transmit or receive an uplink transmission (or transmit or receive a downlink transmission), in one or more symbols in which the wireless communication device 502 performs one or more mobility reference signal measurements.

In some aspects, the one or more multiplexing restriction parameters include one or more multiplexing restriction parameters for downlink/uplink channel and reference signal prioritization. The wireless communication device 502 may ignore (or relax) these multiplexing restriction parameter(s) and instead may schedule (or be scheduled by another wireless communication device) to transmit and receive in one or more symbols (e.g., without needing to prioritize uplink channels or downlink channels).

In some aspects, the one or more multiplexing restriction parameters include another type of multiplexing restriction parameters.

In some aspects, the one or more multiplexing restriction parameters may apply to uplink transmissions such as a physical uplink control channel (PUCCH) transmission, a physical uplink shared channel (PUSCH) transmission, a sounding reference signal (SRS) transmission, and/or another type of uplink transmission. In some aspects, the one or more multiplexing restriction parameters may apply to downlink transmissions such as a physical downlink control channel (PDCCH) transmission, a physical downlink shared channel (PDSCH) transmission, and/or another type of uplink transmission.

In some aspects, the one or more multiplexing restriction parameters may apply to particular frequency ranges in the wireless network, such as an FR1 frequency range, an FR2 frequency range, an FR3 frequency range, an FR4 frequency range, and FR5 frequency range, and/or another frequency range.

In some aspects, the one or more multiplexing restriction parameters may apply where an uplink transmission (or a downlink transmission, a downlink reception, or an uplink reception) and a measured reference signal have different subcarrier spacings (SCSs). In some aspects, the one or more multiplexing restriction parameters may apply where an uplink transmission (or a downlink transmission, a downlink reception, or an uplink reception) and a measured reference signal have the same SCS.

In some aspects, the one or more multiplexing restriction parameters may apply where an uplink transmission (or a downlink transmission, a downlink reception, or an uplink reception) and a measured reference signal are associated with different component carriers (CCs) (e.g., in carrier aggregation (CA) scenarios). In some aspects, the one or more multiplexing restriction parameters may apply where an uplink transmission (or a downlink transmission, a downlink reception, or an uplink reception) and a measured reference signal are associated with the same CC.

In some aspects, the one or more reference signal measurements may include measurement(s) of a synchronization signal block (SSB), a channel state information reference signal (CSI-RS) (e.g., a periodic (P) CSI-RS, an aperiodic (AP) CSI-RS, a semi-persistent (SP) CSI-RS), a beam failure detection reference signal (BFD-RS), a radio link monitoring reference signal (RLM-RS), and/or another type of reference signal. The one or more reference signal measurements may include a layer 1 RSRP (L1-RSRP) measurement, a layer 1 signal to interference plus noise ratio (SINR) (L1-SINR) measurement, a CQI measurement, and/or another type of reference signal measurement. The one or more reference signal measurements may be performed for radio link monitoring (RLM), beam failure detection (BFD), candidate beam selection, and/or for another purpose.

In some aspects, the one or more mobility reference signal measurements may include mobility measurement(s) of an SSB, a CSI-RS (e.g., a periodic CSI-RS, an aperiodic CSI-RS, a semi-persistent CSI-RS), an RLM-RS, a BFD-RS, and/or another type of reference signal. The one or more mobility reference signal measurements may include a synchronization signal RSRP (SS-RSRP) measurement, a synchronization signal SINR (SS-SINR) measurement, a synchronization signal RSRQ (SS-RSRQ) measurement, an intra-frequency mobility measurement, an inter-frequency mobility measurement, an SSB measurement, an RSSI measurement, and/or another type of reference signal measurement. The one or more reference signal measurements may be performed for time division duplexing (TDD) radio frequency band(s), for frequency division duplexing (FDD) band(s), and/or a combination thereof. The one or more reference signal measurements may be performed for RLM, BFD, candidate beam selection, and/or for another purpose.

The following provides various examples of the wireless communication device 502 ignoring a multiplexing restriction requirement and communicating in the full duplex communication mode based at least in part on ignoring the multiplexing restriction requirement.

As an example, in an FR1 frequency range, if a wireless communication device does not support simultaneous transmission/reception and SSB measurement (e.g., the wireless communication device does not support simultaneousRxDataSSB-DiffNumerology), a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols that are to be measured for RLM. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols that are to be measured for RLM.

As another example, in an FR2 frequency range, in some cases, an RLM-RS may include a CSI-RS that is type-D quasi-co-located (QCLed) with an active transmission configuration indicator (TCI) state for PDCCH or PDSCH. The CSI-RS may not be scheduled in a CSI-RS resource that is set with repetition on. In these cases, there may be no scheduling restrictions due to RLM based on the CSI-RS. However, in other cases, a multiplexing restriction parameter may indicate that a wireless communication device is restricted from transmitting (or not expected to transmit) PUCCH, PUSCH, or SRS (or receive PDCCH), PDSCH), or CSI-RS for tracking or for CQI measurement) in one or more RLM-RS symbols that are to be measured for RLM. Since the wireless communication device 502 (e.g., a UE 120, a UE 402) is configured and/or enabled to operate in the full duplex communication mode, the wireless communication device 502 may ignore this multiplexing restriction parameter and instead may transmit PUCCH, PUSCH, or SRS (or receive PDCCH, PDSCH, or CSI-RS for tracking or for CQI measurement) in one or more RLM-RS symbols that are to be measured for RLM.

When intra-band carrier aggregation is performed, the above-described multiplexing restriction parameters may apply to all serving cells on one or more bands of the wireless communication device 502 due to RLM performed on FR1 or FR2 serving primary cells (PCells) or secondary cells (SCells) in the same band. When inter-band carrier aggregation in FR2 is performed, there are no scheduling restrictions on FR2 serving cell(s) in the bands for the following cases, provided that wireless communication device 502 is capable of independent beam management on this FR2 band pair: when performing RLM that is performed on an FR2 serving PCell or a SCell in different bands, and/or when the wireless communication device 502 is configured with a same or different numerology between SSB on one FR2 band and data on another other FR2 band.

As another example, in an FR1 frequency range, if a wireless communication device does not support simultaneous transmission/reception and SSB measurement, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols that are to be measured for BFD. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols that are to be measured for BFD.

As another example, in an FR2 frequency range, in some cases, no reference signals are provided for BFD or a CSI-RS is configured for BFD and is type-D QCLed with an active TCI state for PDCCH or PDSCH. The CSI-RS may not be scheduled in a CSI-RS resource that is set with repetition on. In these cases, there may be no scheduling restrictions due to BFD performed based on the CSI-RS. However, in other cases, a multiplexing restriction parameter may indicate that a wireless communication device is restricted from transmitting (or not expected to transmit) PUCCH, PUSCH, or SRS (or receive PDCCH), PDSCH), or CSI-RS for tracking or for CQI measurement) in one or more BFD-RS symbols that are to be measured for BFD. Since the wireless communication device 502 (e.g., a UE 120, a UE 402) is configured and/or enabled to operate in the full duplex communication mode, the wireless communication device 502 may ignore this multiplexing restriction parameter and instead may transmit PUCCH, PUSCH, or SRS (or receive PDCCH, PDSCH, or CSI-RS for tracking or for CQI measurement) in one or more BFD-RS symbols that are to be measured for BFD.

When intra-band carrier aggregation in FR1 or FR2 is configured, the multiplexing restriction parameters may apply to all SCells that are aggregated in the same band as the PCells or SCells. When inter-band carrier aggregation in FR2 is performed, there are no scheduling restrictions on FR2 serving cells in the bands due to BFD performed on FR2 serving cell(s) in different band(s), provided that the wireless communication device 502 is capable of independent beam management on this FR2 band pair. Additionally, there is no scheduling restriction if the wireless communication device 502 is configured with different numerology between SSB on one FR2 band and data on the other FR2 band provided the wireless communication device 502 is configured for intra-band management (IBM) operation for the band pair.

As another example, in an FR1 frequency range, if a wireless communication device does not support simultaneous transmission/reception and SSB measurement, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols that are to be measured for L1-RSRP measurement. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols that are to be measured for L1-RSRP measurement.

As another example, in an FR2 frequency range, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols that are to be measured for candidate beam detection. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols that are to be measured for candidate beam detection.

When intra-band carrier aggregation in FR1 or FR2 is configured, the scheduling restrictions apply to all serving cells that are aggregated in the same band as the cell where L1-RSRP measurement is performed. When inter-band carrier aggregation in FR2 is performed, there are no scheduling restrictions on FR2 serving cells in the bands due to candidate beam detection performed on FR2 serving cell(s) in different band(s), provided that the FR2 serving cell(s) and the FR2 serving cell(s) for candidate beam detection are in an FR2 band pair and the wireless communication device 502 is capable of independent beam management on this FR2 band pair. Additionally, there is no scheduling restriction if the wireless communication device 502 is configured with different numerology between SSB on one FR2 band and data on the other FR2 band provided the wireless communication device 502 is configured for IBM operation for the band pair.

As another example, in an FR1 frequency range, if a wireless communication device does not support simultaneous transmission/reception and SSB measurement, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more symbols corresponding to SSB indexes that configured for L1-RSRP measurement. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols corresponding to SSB indexes that configured for L1-RSRP measurement.

As another example, in an FR2 frequency range, in some cases, a CSI-RS is configured for L1-RSRP measurement and the CSI-RS is type-D QCLed with an active TCI state for PDCCH or PDSCH. The CSI-RS may not be scheduled in a CSI-RS resource that is set with repetition on, and N=1 may be applied as specified in clause 9.5.4.2 of TS 38.133 (e.g., N=1 for CSI-RS with repetitions off, N may be >1 for P/SP CSI-RS with repetitions ON, and N=1 for AP CSI-RS with repetitions ON). In these cases, there may be no scheduling restrictions due to L1-RSRP measurement performed based on the CSI-RS. However, in other cases, a multiplexing restriction parameter may indicate that a wireless communication device is restricted from transmitting (or not expected to transmit) PUCCH, PUSCH, or SRS (or receive PDCCH), PDSCH), or CSI-RS for tracking or for CQI measurement) in one or more symbols corresponding to SSB indexes configured for L1-RSRP measurement, in one or more symbols corresponding to a periodic CSI-RS resource configured for L1-RSRP measurement, in one or more symbols corresponding to a semi-persistent CSI-RS resource configured for L1-RSRP measurement when the resource is active, and/or in one or more symbols corresponding to an aperiodic CSI-RS resource configured for L1-RSRP measurement when reporting is triggered. Since the wireless communication device 502 (e.g., a UE 120, a UE 402) is configured and/or enabled to operate in the full duplex communication mode, the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols corresponding to SSB indexes configured for L1-RSRP measurement, in one or more symbols corresponding to a periodic CSI-RS resource configured for L1-RSRP measurement, in one or more symbols corresponding to a semi-persistent CSI-RS resource configured for L1-RSRP measurement when the resource is active, and/or in one or more symbols corresponding to an aperiodic CSI-RS resource configured for L1-RSRP measurement when reporting is triggered.

When intra-band carrier aggregation in FR1 or FR2 is configured, the scheduling restrictions apply to all SCells that are aggregated in the same band as the PCell or SCell. When inter-band carrier aggregation in FR2 is performed, there are no scheduling restrictions on FR2 serving cells in the bands due to L1-RSRP measurement performed on FR2 serving cell(s) in different band(s), provided that the wireless communication device 502 is capable of independent beam management on this FR2 band pair. Additionally, there is no scheduling restriction if the wireless communication device 502 is configured with different numerology between SSB on one FR2 band and data on the other FR2 band provided the wireless communication device 502 is configured for IBM operation for the band pair.

As another example, in an FR1 frequency range, if a wireless communication device does not support simultaneous transmission/reception and SSB measurement, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more symbols corresponding to SSB indexes that configured for L1-SINR measurement. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols corresponding to SSB indexes that configured for L1-SINR measurement.

As another example, in an FR2 frequency range, in some cases, a CSI-RS is configured for L1-SINR measurement and the CSI-RS is type-D QCLed with an active TCI state for PDCCH or PDSCH. The CSI-RS may not be scheduled in a CSI-RS resource that is set with repetition on, and N=1 may be applied as specified in clause 9.5.4.2 of TS 38.133 (e.g., N=1 for CSI-RS with repetitions off, N may be >1 for P/SP CSI-RS with repetitions ON, and N=1 for AP CSI-RS with repetitions ON). The CSI-RS may also include a CSI-RS based channel measurement resource (CMR), a CSI-based CMR plus a CSI-RS based zero power interference measurement resource (ZP-IMR) or a non-zero power interference measurement resource (NZP-IMR), and/or another CSI-RS configuration. In these cases, there may be no scheduling restrictions due to L1-RSRP measurement performed based on the CSI-RS. However, in other cases, a multiplexing restriction parameter may indicate that a wireless communication device is restricted from transmitting (or not expected to transmit) PUCCH, PUSCH, or SRS (or receive PDCCH), PDSCH), or CSI-RS for tracking or for CQI measurement) in one or more symbols corresponding to SSB indexes configured for L1-SINR measurement, in one or more symbols corresponding to a periodic CSI-RS resource configured for L1-SINR measurement, in one or more symbols corresponding to a semi-persistent CSI-RS resource configured for L1-SINR measurement when the resource is active, and/or in one or more symbols corresponding to an aperiodic CSI-RS resource configured for L1-SINR measurement when reporting is triggered. Since the wireless communication device 502 (e.g., a UE 120, a UE 402) is configured and/or enabled to operate in the full duplex communication mode, the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols corresponding to SSB indexes configured for L1-SINR measurement, in one or more symbols corresponding to a periodic CSI-RS resource configured for L1-SINR measurement, in one or more symbols corresponding to a semi-persistent CSI-RS resource configured for L1-SINR measurement when the resource is active, and/or in one or more symbols corresponding to an aperiodic CSI-RS resource configured for L1-SINR measurement when reporting is triggered.

When intra-band carrier aggregation in FR1 or FR2 is configured, the scheduling restrictions apply to all SCells that are aggregated in the same band as the PCell or SCell. SSB and inter-band CA are not mentioned for FR2.

As another example, in an FR1 frequency range, in some cases, a wireless communication device may perform intra-frequency measurements in a TDD band. Here, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SSB measurement timing configuration (SMTC) window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window.

As another example, in an FR1 frequency range, in some cases, a wireless communication device may perform intra-frequency measurements in a TDD band. Here, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window.

As another example, in an FR1 frequency range and for measurements with different SCSs than the SCS(s) for PDSCH/PDCCH, a wireless communication device may not support simultaneous transmission/reception and SSB measurement and a deriveSSB_IndexFromCell may be enabled for the wireless communication. As a result, a multiplexing restriction parameter for the wireless communication device may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured (e.g., for SS-RSRP, SS-SINR, and/or SS-RSRQ), in one or more data symbols before each consecutive SSB symbol to be measured, and in one or more data symbols after each consecutive SSB symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured, in one or more data symbols before each consecutive SSB symbol to be measured, and in one or more data symbols after each consecutive SSB symbol that is to be measured within an SMTC window.

As another example, in an FR1 frequency range and for measurements with different SCSs than the SCS(s) for PDSCH/PDCCH, a wireless communication device may not support simultaneous transmission/reception and SSB measurement and a deriveSSB_IndexFromCell may be disabled for the wireless communication. As a result, a multiplexing restriction parameter for the wireless communication device may indicate that the wireless communication device is restricted from transmitting (or not expected to transmit) PUCCH, PUSCH, or SRS (or receiving a PDCCH, a PDSCH, or a CSI-RS for tracking or for CQI measurement) in all symbols within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols within an SMTC window.

As another example, in an FR2 frequency range in which intra-frequency measurements are enabled, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window.

As another example, in an FR2 frequency range in which intra-frequency measurements are enabled, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window.

When intra-band carrier aggregation in FR1 or FR2 is performed, the scheduling restrictions due to a given serving cell should also apply to all other serving cells in the same band on the symbols that fully or partially overlap with the aforementioned restricted symbols. When inter-band carrier aggregation in FR2 is performed, there are no scheduling restrictions on FR2 serving cells in the bands due to SS-RSRP, SS-RSRQ or SS-SINR measurement on an FR2 intra-frequency cell in different bands, provided that the wireless communication device 502 is capable of independent beam management on this FR2 band pair. Additionally, there is no scheduling restriction if the wireless communication device 502 is configured with different numerology between SSB on one FR2 band and data on the other FR2 band provided the wireless communication device 502 is configured for IBM operation for the band pair.

As another example, in an FR1 frequency range, in some cases, a wireless communication device may perform inter-frequency measurements without measurement gaps in a TDD band. Here, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SSB measurement timing configuration (SMTC) window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window.

As another example, in an FR1 frequency range, in some cases, a wireless communication device may perform inter-frequency measurements without measurement gaps in a TDD band. Here, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window.

As another example, in an FR1 frequency range and for measurements with different SCSs than the SC S(s) for PDSCH/PDCCH, a wireless communication device may not support simultaneous transmission/reception and SSB measurement. If the wireless communication device performs inter-frequency measurements without measurement gaps in a TDD band, a multiplexing restriction parameter for the wireless communication device may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured (e.g., for SS-RSRP, SS-SINR, and/or SS-RSRQ), on one or more data symbols before each consecutive SSB symbol to be measured, and on one or more data symbols after each consecutive SSB symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured, in one or more data symbols before each consecutive SSB symbol to be measured, and in one or more data symbols after each consecutive SSB symbol that is to be measured within an SMTC window.

As another example, in an FR1 frequency range and for measurements with different SCSs than the SCS(s) for PDSCH/PDCCH, a wireless communication device may not support simultaneous transmission/reception and SSB measurement. If the wireless communication device performs inter-frequency measurements without measurement gaps in a TDD band, a multiplexing restriction parameter for the wireless communication device may indicate that the wireless communication device is restricted from transmitting (or not expected to transmit) PUCCH, PUSCH, or SRS (or receiving a PDCCH, a PDSCH, or a CSI-RS for tracking or for CQI measurement) in all symbols within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more symbols within an SMTC window.

As another example, in an FR2 frequency range in which inter-frequency measurements are enabled, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRP measurement and/or SS-SINR measurement, on one or more data symbols before each consecutive SSB symbol to be measured, and on one or more data symbols after each consecutive SSB symbol that is to be measured within an SMTC window.

As another example, in an FR2 frequency range in which inter-frequency measurements are enabled, a multiplexing restriction parameter may indicate that the wireless communication device is restricted from transmitting (or not expected to transmit) PUCCH, PUSCH, or SRS (or receiving a PDCCH, a PDSCH, or a CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window. Since the wireless communication device 502 (e.g., a UE 120, a UE 402) supports simultaneous transmission/reception and SSB measurement (e.g., because the wireless communication device 502 is capable of operating in the full duplex communication mode), the wireless communication device 502 may ignore this multiplexing restriction parameter and instead may transmit PUCCH, PUSCH, or SRS (or receive PDCCH, PDSCH, or CSI-RS for tracking or for CQI measurement) in one or more SSB symbols to be measured for SS-RSRQ measurement, one or more symbols to be measured for RSSI measurement, on one or more data symbols before each consecutive symbol to be measured, and on one or more data symbols after each consecutive symbol that is to be measured within an SMTC window.

When intra-band carrier aggregation is performed, the scheduling restrictions due to a given serving cell should also apply to all other serving cells in the same band on the symbols that fully or partially overlap with the aforementioned restricted symbols.

As another example, for uplink/downlink channel and reference signal prioritization, a multiplexing restriction parameter may include a multiplexing restriction parameter for restricting transmission or reception of an uplink transmission in a symbol in which the wireless communication device 502 is to receive an SSB (e.g., the symbol is not expected to have an uplink slot format indicator (SFI-U)). Since the full duplex communication mode is enabled for the wireless communication device 502, the wireless communication device 502 may ignore this multiplexing restriction parameter, and may instead transmit or receive the uplink transmission in the symbol in which the wireless communication device 502 is to receive the SSB. A wireless communication device 504a-504n with which the wireless communication device 502 communicates may also ignore this multiplexing restriction parameter and instead may transmit the SSB in the symbol.

As another example, for uplink/downlink channel and reference signal prioritization, a multiplexing restriction parameter may include a multiplexing restriction parameter for restricting transmission or reception of a downlink transmission in a symbol in which the wireless communication device 502 is to transmit a random access channel (RACH) occasion (RO) (e.g., the symbol is not expected to have a downlink slot format indicator (SFI-D)). Since the full duplex communication mode is enabled for the wireless communication device 502, the wireless communication device 502 may ignore this multiplexing restriction parameter, and may instead transmit or receive the RO in the symbol having a downlink slot format indicator (e.g., in which the wireless communication device 502 may receive a downlink transmission). A wireless communication device 504a-504n with which the wireless communication device 502 communicates may also ignore this multiplexing restriction parameter and instead may schedule the symbol to have a downlink slot format indicator.

As another example, for uplink/downlink channel and reference signal prioritization, a multiplexing restriction parameter may include a multiplexing restriction parameter for restricting transmission or reception of an uplink transmission in a symbol in which the wireless communication device 502 is to receive a master information block (MIB) in a control resource set 0 (CORESET 0) (e.g., the symbol is not expected to have an uplink slot format indicator). Since the full duplex communication mode is enabled for the wireless communication device 502, the wireless communication device 502 may ignore this multiplexing restriction parameter, and instead may transmit or receive the MIB in the symbol having an uplink slot format indicator (e.g., in which the wireless communication device 502 may transmit an uplink transmission). A wireless communication device 504a-504n with which the wireless communication device 502 communicates may also ignore this multiplexing restriction parameter and instead may schedule the symbol to have an uplink slot format indicator.

As another example, for uplink/downlink channel and reference signal prioritization, a multiplexing restriction parameter may include a multiplexing restriction parameter for restricting transmission or reception of an uplink transmission in a radio resource control (RRC) configured downlink symbol (e.g., an RRC communication cancels PUCCH, PUSCH, PRACH, and/or SRS in the symbol such that the symbol is not expected to have an uplink slot format indicator). Since the full duplex communication mode is enabled for the wireless communication device 502, the wireless communication device 502 may ignore this multiplexing restriction parameter, and instead may transmit or receive PUCCH, PUSCH, PRACH, and/or SRS in the symbol (e.g., on different CCs and on the same band). A wireless communication device 504a-504n with which the wireless communication device 502 communicates may also ignore this multiplexing restriction parameter and instead may schedule the symbol to have an uplink slot format indicator.

As another example, for uplink/downlink channel and reference signal prioritization, a multiplexing restriction parameter may include a multiplexing restriction parameter for restricting transmission or reception of a downlink transmission in an RRC configured uplink symbol (e.g., an RRC communication cancels CORESET, PDSCH, CSI-RS, and/or positioning reference signal (PRS) (if no measurement gap) in the symbol such that the symbol is not expected to have a downlink slot format indicator). Since the full duplex communication mode is enabled for the wireless communication device 502, the wireless communication device 502 may ignore this multiplexing restriction parameter, and instead may transmit or receive CORESET, PDSCH, CSI-RS, and/or PRS in the symbol (e.g., on different CCs and on the same band). A wireless communication device 504a-504n with which the wireless communication device 502 communicates may also ignore this multiplexing restriction parameter and instead may schedule the symbol to have a downlink slot format indicator.

As another example, for uplink/downlink channel and reference signal prioritization, a multiplexing restriction parameter may include a multiplexing restriction parameter for restricting transmission or reception of an uplink transmission and reception of a downlink communication in an RRC configured flexible symbol for which no slot format indicator (SFI) is received (e.g., an RRC communication indicating a flexible SFI (SFI-F) for the symbol that cancels semi-persistent scheduling (SPS), cancels a configured CSI-RS/downlink PRS, cancels a configured PUSCH/PUCCH/PRACH/SRS if a wireless communication device is provided with an EnableConfiguredUl-r16 parameter). Since the full duplex communication mode is enabled for the wireless communication device 502, the wireless communication device 502 may ignore this multiplexing restriction parameter, and instead may transmit or receive CSI-RS, downlink PRS, PUSCH, PUCCH, PRACH, and/or SRS in the symbol (e.g., on different CCs and on the same band). A wireless communication device 504a-504n with which the wireless communication device 502 communicates may also ignore this multiplexing restriction parameter and instead may perform SPS, may transmit a downlink PRS, and/or may perform other types of communications in the symbol.

As another example, for uplink/downlink channel and reference signal prioritization, a multiplexing restriction parameter may include a multiplexing restriction parameter for restricting transmission or reception of a downlink dynamic grant (DG) for a symbol that is assigned an uplink SFI (SFI-U) (e.g., the symbol having the SFI-U is not expected to have a downlink DG for PDSCH/CSI-RS). Since the full duplex communication mode is enabled for the wireless communication device 502, the wireless communication device 502 may ignore this multiplexing restriction parameter, and instead may transmit or receive a downlink DG for PDSCH/CSI-RS in the symbol having an uplink slot format indicator (e.g., on different CCs and on the same band). A wireless communication device 504a-504n with which the wireless communication device 502 communicates may also ignore this multiplexing restriction parameter and instead may transmit or receive a downlink DG for PDSCH/CSI-RS in the symbol having an uplink slot format indicator.

As another example, for uplink/downlink channel and reference signal prioritization, a multiplexing restriction parameter may include a multiplexing restriction parameter for restricting transmission or reception of an uplink DG for a symbol that is assigned a downlink SFI (SFI-D) (e.g., the symbol having the SFI-D is not expected to have an uplink DG for PUSCH/PUCCH/PRACH/SRS). Since the full duplex communication mode is enabled for the wireless communication device 502, the wireless communication device 502 may ignore this multiplexing restriction parameter, and instead may transmit or receive an uplink DG for PUSCH/PUCCH/PRACH/SRS in the symbol having a downlink slot format indicator (e.g., on different CCs and on the same band). A wireless communication device 504a-504n with which the wireless communication device 502 communicates may also ignore this multiplexing restriction parameter and instead may transmit or receive an uplink DG for PUSCH/PUCCH/PRACH/SRS in the symbol having a downlink slot format indicator.

As another example, for uplink/downlink channel and reference signal prioritization, a multiplexing restriction parameter may include a multiplexing restriction parameter for canceling a configured uplink transmission in a symbol that is assigned an SFI-D or a flexible SFI (SFI-F) (e.g., the symbol having the SFI-F/D is not expected to be configured for PUSCH/PUCCH/PRACH/SRS). Since the full duplex communication mode is enabled for the wireless communication device 502, the wireless communication device 502 may ignore this multiplexing restriction parameter, and instead may use the symbol having the SFI-F/D for transmission or reception of PUSCH/PUCCH/PRACH/SRS (e.g., on different CCs and on the same band). A wireless communication device 504a-504n with which the wireless communication device 502 communicates may use the symbol having the SFI-F/D for transmission or reception of PUSCH/PUCCH/PRACH/SRS.

As another example, for uplink/downlink channel and reference signal prioritization, a multiplexing restriction parameter may include a multiplexing restriction parameter for canceling a configured downlink transmission in a symbol that is assigned an SFI-U or an SFI-F (e.g., the symbol having the SFI-F/U is not expected to be configured for CORESET/SPS/CSI-RS). Since the full duplex communication mode is enabled for the wireless communication device 502, the wireless communication device 502 may ignore this multiplexing restriction parameter, and instead may use the symbol having the SFI-F/D for transmission or reception of CORESET/SPS/CSI-RS (e.g., on different CCs and on the same band). A wireless communication device 504a-504n with which the wireless communication device 502 communicates may use the symbol having the SFI-F/U for transmission or reception of CORESET/SPS/CSI-RS.

As another example, for uplink/downlink channel and reference signal prioritization, a multiplexing restriction parameter includes a multiplexing restriction parameter for canceling a configured downlink transmission in a symbol for which an uplink dynamic grant is received (e.g., an uplink DG for the symbol cancels a configured PDCCH/SPS/CSI-RS/PRS for the symbol). Since the full duplex communication mode is enabled for the wireless communication device 502, the wireless communication device 502 may ignore this multiplexing restriction parameter, and instead may transmit or receive the configured downlink transmission of the symbol along with transmitting or receiving an uplink transmission based at least in part on the uplink DG (e.g., on different CCs and on the same band). A wireless communication device 504a-504n with which the wireless communication device 502 communicates may transmit or receive the configured downlink transmission of the symbol along with transmitting or receiving an uplink transmission based at least in part on the uplink DG.

As another example, for uplink/downlink channel and reference signal prioritization, a multiplexing restriction parameter includes a multiplexing restriction parameter for canceling a configured uplink transmission in a symbol for which a downlink dynamic grant is received (e.g., a downlink DG for the symbol cancels a configured PUSCH/PUCCH/PRACH/SRS for the symbol). Since the full duplex communication mode is enabled for the wireless communication device 502, the wireless communication device 502 may ignore this multiplexing restriction parameter, and instead may transmit or receive the configured uplink transmission of the symbol along with transmitting or receiving a downlink transmission based at least in part on the downlink DG (e.g., on different CCs and on the same band). A wireless communication device 504a-504n with which the wireless communication device 502 communicates may transmit or receive the configured uplink transmission of the symbol along with transmitting or receiving a downlink transmission based at least in part on the downlink DG.

As indicated above, FIG. 5 is provided as one or more examples. Other examples may differ from what is described with regard to FIG. 5.

Figure 6:
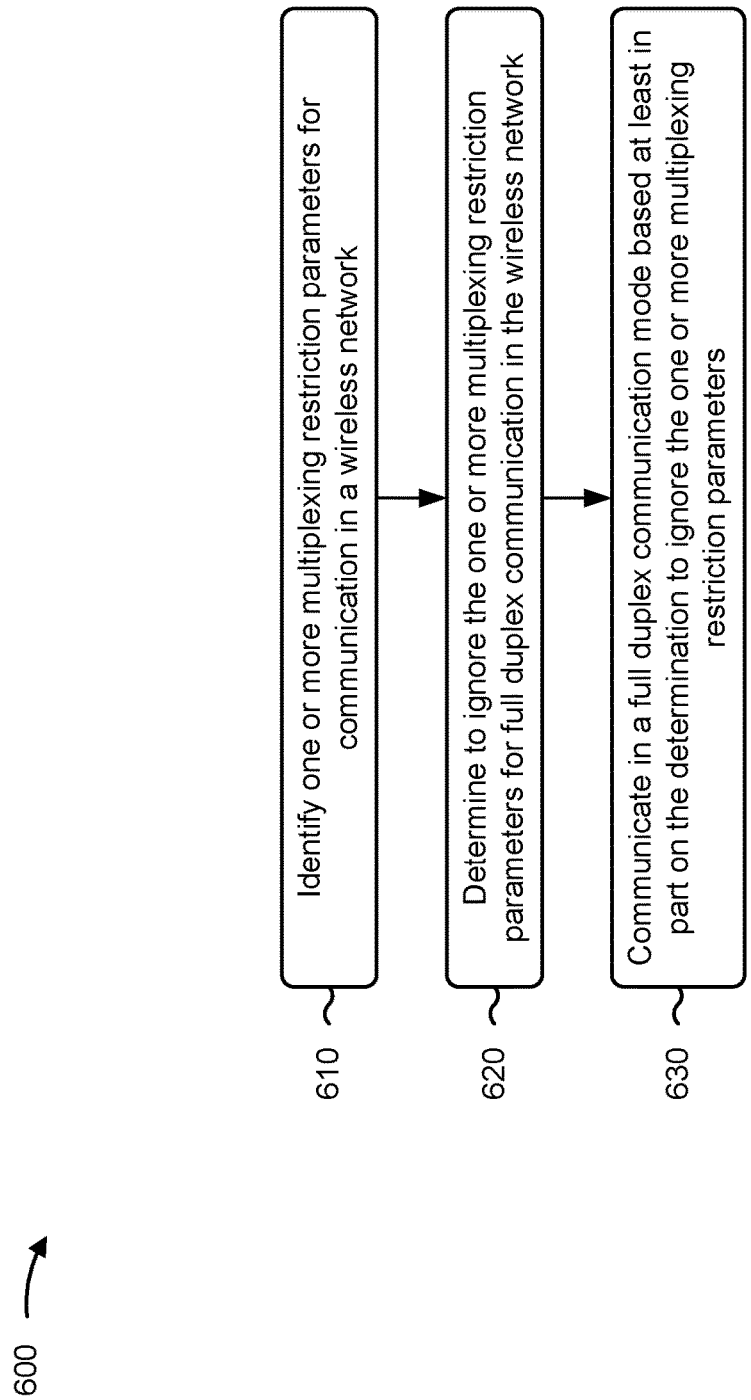
FIG. 6 is a diagram illustrating an example process associated with multiplexing restriction relaxation for full duplex communication, in accordance with the present disclosure.

FIG. 6 is a diagram illustrating an example process 600 performed, for example, by a wireless communication device, in accordance with the present disclosure. Example process 600 is an example where the wireless communication device (e.g., a base station 110, a UE 120, a DU 330, an RU 340, a UE 402, a base station 404, a wireless communication device 502, and/or other examples) performs operations associated with multiplexing restriction relaxation for full duplex communication.

As shown in FIG. 6, in some aspects, process 600 may include identifying one or more multiplexing restriction parameters for communication in a wireless network (block 610). For example, the wireless communication device (e.g., using communication manager 140, communication manager 150, communication manager 708, and/or identification component 710, depicted in FIG. 7) may identify one or more multiplexing restriction parameters for communication in a wireless network, as described above.

As further shown in FIG. 6, in some aspects, process 600 may include determining to ignore the one or more multiplexing restriction parameters for full duplex communication in the wireless network (block 620). For example, the wireless communication device (e.g., using communication manager 140, communication manager 150, communication manager 708, and/or determination component 712, depicted in FIG. 7) may determine to ignore the one or more multiplexing restriction parameters for full duplex communication in the wireless network, as described above.

As further shown in FIG. 6, in some aspects, process 600 may include communicating in a full duplex communication mode based at least in part on the determination to ignore the one or more multiplexing restriction parameters (block 630). For example, the wireless communication device (e.g., using communication manager 140, communication manager 150, communication manager 708, reception component 702, and/or transmission component 704, depicted in FIG. 7) may communicate in a full duplex communication mode based at least in part on the determination to ignore the one or more multiplexing restriction parameters, as described above.

Process 600 may include additional aspects, such as any single aspect or any combination of aspects described below and/or in connection with one or more other processes described elsewhere herein.

In a first aspect, the one or more multiplexing restriction parameters include at least one of one or more first multiplexing restriction parameters for restricting transmission or reception of an uplink transmission in one or more first symbols in which the wireless communication device is to perform one or more reference signal measurements, or one or more second multiplexing restriction parameters for restricting transmission or reception of the uplink transmission in one or more second symbols in which the wireless communication device is to perform one or more mobility reference signal measurements.

In a second aspect, alone or in combination with the first aspect, the uplink transmission includes at least one of a PUCCH transmission, a PUSCH transmission, or an SRS transmission.

In a third aspect, alone or in combination with one or more of the first and second aspects, the uplink transmission and a reference signal associated with the one or more reference signal measurements are associated with at least one of an FR1 frequency range, an FR2 frequency range, an FR3 frequency range, an FR4 frequency range, or an FR5 frequency range.

In a fourth aspect, alone or in combination with one or more of the first through third aspects, the uplink transmission and a reference signal associated with the one or more reference signal measurements have same or different SCS.

In a fifth aspect, alone or in combination with one or more of the first through fourth aspects, the uplink transmission and a reference signal associated with the one or more reference signal measurements are associated with same or different CCs.

In a sixth aspect, alone or in combination with one or more of the first through fifth aspects, the one or more mobility reference signal measurements include at least one of a SS-RSRP measurement, a SS-SINR measurement, or a SS-RSRQ measurement.

In a seventh aspect, alone or in combination with one or more of the first through sixth aspects, the one or more mobility reference signal measurements are for at least one of intra-frequency mobility measurement, or inter-frequency mobility measurement.

In an eighth aspect, alone or in combination with one or more of the first through seventh aspects, at least one of the one or more first symbols or the one or more second symbols are configured for at least one of TDD, or FDD.

In a ninth aspect, alone or in combination with one or more of the first through eighth aspects, the one or more reference signal measurements are associated with an SSB for RLM.

In a tenth aspect, alone or in combination with one or more of the first through ninth aspects, the one or more reference signal measurements are associated with an RLM-RS.

In an eleventh aspect, alone or in combination with one or more of the first through tenth aspects, the one or more reference signal measurements are associated with an SSB for BFD.

In a twelfth aspect, alone or in combination with one or more of the first through eleventh aspects, the one or more reference signal measurements are associated with a BFD-RS.

In a thirteenth aspect, alone or in combination with one or more of the first through twelfth aspects, the one or more reference signal measurements are for candidate beam detection.

In a fourteenth aspect, alone or in combination with one or more of the first through thirteenth aspects, the one or more reference signal measurements are associated with one or more SSB indexes for RLM.

In a fifteenth aspect, alone or in combination with one or more of the first through fourteenth aspects, the one or more reference signal measurements are associated with at least one of a periodic CSI-RS for L1-RSRP measurement, a semi-periodic CSI-RS for L1-RSRP measurement, an aperiodic CSI-RS for L1-RSRP measurement, or an SSB for L1-RSRP measurement.

In a sixteenth aspect, alone or in combination with one or more of the first through fifteenth aspects, the one or more reference signal measurements are associated with at least one of an SSB for L1-SINR measurement, or a periodic CSI-RS for L1-SINR measurement.

In a seventeenth aspect, alone or in combination with one or more of the first through sixteenth aspects, the one or more second symbols occur in an SMTC window duration.

In an eighteenth aspect, alone or in combination with one or more of the first through seventeenth aspects, the one or more second symbols include a plurality of consecutive symbols, in the SMTC window duration, in which the one or more mobility reference signal measurements are to be performed, and the one or more multiplexing restriction parameters include a third multiplexing restriction parameter for restricting transmission or reception of the uplink transmission in at least one of a first symbol, in the SMTC window duration, prior to the plurality of consecutive symbols, or a second symbol, in the SMTC window duration, after the plurality of consecutive symbols.

In a nineteenth aspect, alone or in combination with one or more of the first through eighteenth aspects, the one or more mobility reference signal measurements comprise at least one of an SSB measurement, or an RSSI measurement.

In a twentieth aspect, alone or in combination with one or more of the first through nineteenth aspects, the one or more second symbols include all symbols in the SMTC window duration.

In a twenty-first aspect, alone or in combination with one or more of the first through twentieth aspects, the one or more multiplexing restriction parameters comprise at least one of a multiplexing restriction parameter for restricting transmission or reception of an uplink transmission in a symbol in which the wireless communication device is to receive an SSB, a multiplexing restriction parameter for restricting transmission or reception of a downlink transmission in a symbol in which the wireless communication device is to transmit a RACH occasion, a multiplexing restriction parameter for restricting transmission or reception of an uplink transmission in a symbol in which the wireless communication device is to receive a MIB, a multiplexing restriction parameter for restricting transmission or reception of an uplink transmission in an RRC configured downlink symbol, a multiplexing restriction parameter for restricting transmission or reception of an uplink transmission in an RRC configured uplink symbol, a multiplexing restriction parameter for restricting transmission or reception of an uplink transmission and reception of a downlink communication in an RRC configured flexible symbol for which no SFI is received, a multiplexing restriction parameter for restricting transmission or reception of a downlink dynamic grant for a symbol that is assigned an SFI-U, a multiplexing restriction parameter for restricting transmission or reception of an uplink dynamic grant for a symbol that is assigned a n SFI-D, a multiplexing restriction parameter for canceling a configured uplink transmission in a symbol that is assigned an SFI-D or a SFI-F, a multiplexing restriction parameter for canceling a configured downlink transmission in a symbol that is assigned an SFI-U or an SFI-F, a multiplexing restriction parameter for canceling a configured downlink transmission in a symbol for which an uplink dynamic grant is received, or a multiplexing restriction parameter for canceling a configured uplink transmission in a symbol for which a downlink dynamic grant is received.

In a twenty-second aspect, alone or in combination with one or more of the first through twenty-first aspects, the wireless communication device comprises a UE, and communicating in the full duplex communication mode comprises at least one of forwarding communications between another UE and a base station as a relay UE in the full duplex communication mode, communicating with a single base station in the full duplex communication mode, or communicating with a plurality of base stations in the full duplex communication mode.

In a twenty-third aspect, alone or in combination with one or more of the first through twenty-second aspects, the wireless communication device comprises a base station, and communicating in the full duplex communication mode comprises at least one of communicating with a single UE in the full duplex communication mode, where the UE also communicates in the full duplex communication mode, or communicating with a plurality of UEs in the full duplex communication mode.

In a twenty-fourth aspect, alone or in combination with one or more of the first through twenty-third aspects, the one or more multiplexing restriction parameters are specific to a particular beam pair including an uplink beam and a downlink beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
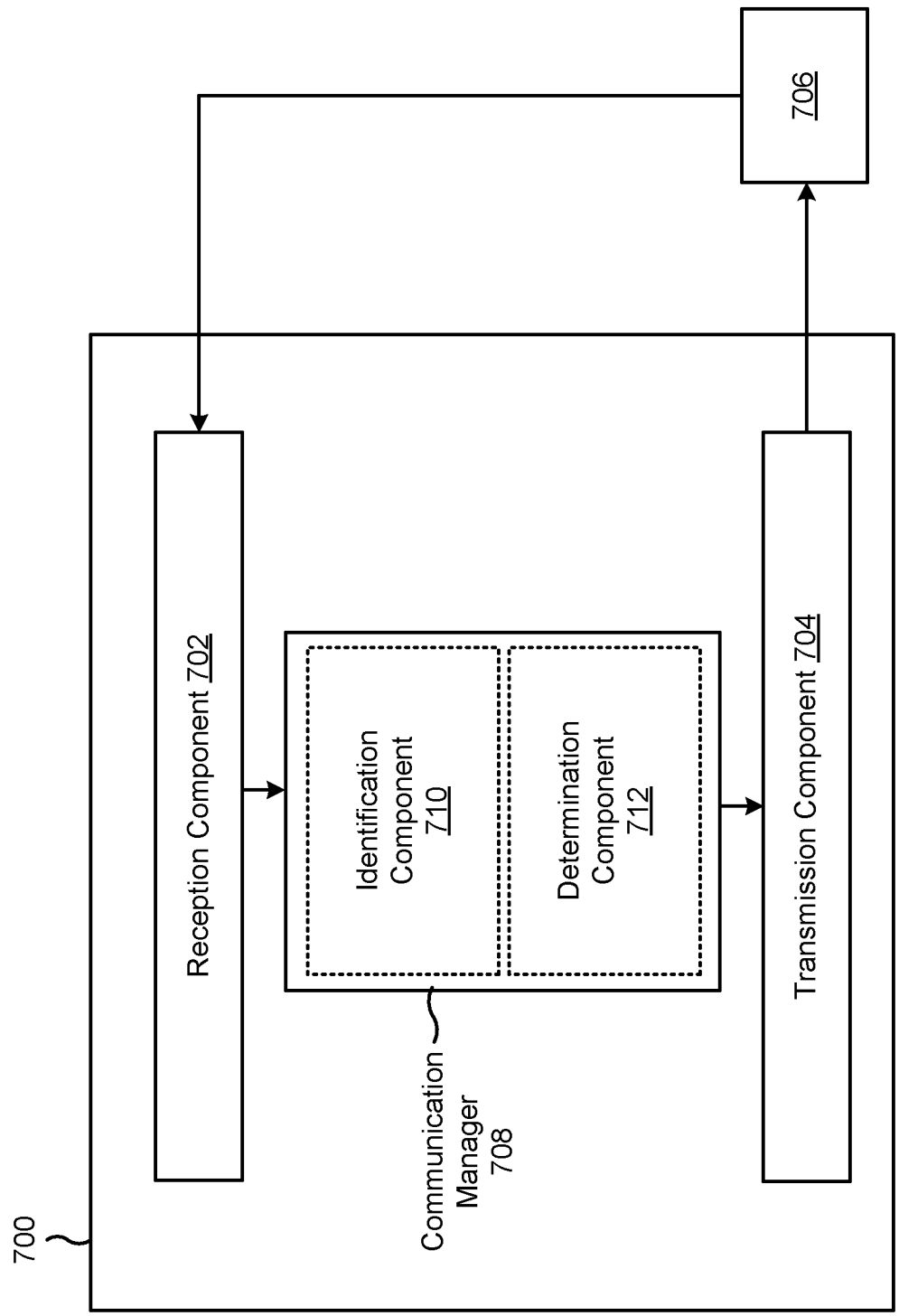
FIG. 7 is a diagram of an example apparatus for wireless communication, in accordance with the present disclosure.

FIG. 7 is a diagram of an example apparatus 700 for wireless communication. The apparatus 700 may be a wireless communication device (e.g., a base station 110, a UE 120, a DU 330, an RU 340, a UE 402, a base station 404, a wireless communication device 502, and/or other examples), or a wireless communication device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 708. The communication manager 708 may include one or more of an identification component 710 or a determination component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the wireless communication device described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the wireless communication device described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the wireless communication device described in connection with FIG. 2. In some aspects, the transmission component 704 may be co-located with the reception component 702 in a transceiver.

The communication manager 708 may control and/or otherwise manage one or more operations of the reception component 702 and/or the transmission component 704. In some aspects, the communication manager 708 may include one or more antennas, a modem, a controller/processor, a memory, or a combination thereof, of the base station 110 and/or the UE 120 described in connection with FIG. 2. The communication manager 708 may be, or be similar to, the communication manager 140 and/or the communication manager 150 depicted in FIGS. 1 and 2. For example, in some aspects, the communication manager 708 may be configured to perform one or more of the functions described as being performed by the communication manager 140 and/or the communication manager 150. In some aspects, the communication manager 708 may include the reception component 702 and/or the transmission component 704.

The identification component 710 may identify one or more multiplexing restriction parameters for communication in a wireless network. The determination component 712 may determine to ignore the one or more multiplexing restriction parameters for full duplex communication in the wireless network. The reception component 702 and the transmission component 704 may communicate in a full duplex communication mode based at least in part on the determination of the determination component 712 to ignore the one or more multiplexing restriction parameters.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a wireless communication device, comprising: identifying one or more multiplexing restriction parameters for communication in a wireless network; determining to ignore the one or more multiplexing restriction parameters for full duplex communication in the wireless network; and communicating in a full duplex communication mode based at least in part on the determination to ignore the one or more multiplexing restriction parameters.

Aspect 2: The method of Aspect 1, wherein the one or more multiplexing restriction parameters include at least one of: one or more first multiplexing restriction parameters for restricting transmission or reception of an uplink transmission in one or more first symbols in which the wireless communication device is to perform one or more reference signal measurements, or one or more second multiplexing restriction parameters for restricting transmission or reception of the uplink transmission in one or more second symbols in which the wireless communication device is to perform one or more mobility reference signal measurements.

Aspect 3: The method of Aspect 2, wherein the uplink transmission includes at least one of: a physical uplink control channel (PUCCH) transmission, a physical uplink shared channel (PUSCH) transmission, or a sounding reference signal (SRS) transmission.

Aspect 4: The method of Aspect 2 or 3, wherein the uplink transmission and a reference signal associated with the one or more reference signal measurements are associated with at least one of: a frequency range 1 (FR1) frequency range, a frequency range 2 (FR2) frequency range, a frequency range 3 (FR3) frequency range, a frequency range 4 (FR4) frequency range, or a frequency range 5 (FR5) frequency range.

Aspect 5: The method of one or more of Aspects 2-4, wherein the uplink transmission and a reference signal associated with the one or more reference signal measurements have same or different sub-carrier spacing (SCS).

Aspect 6: The method of one or more of Aspects 2-5, wherein the uplink transmission and a reference signal associated with the one or more reference signal measurements are associated with same or different component carriers (CCs).

Aspect 7: The method of one or more of Aspects 2-6, wherein the one or more mobility reference signal measurements include at least one of: a synchronization signal reference signal received power (SS-RSRP) measurement, a synchronization signal signal-to-interference-plus-noise ratio (SS-SINR) measurement, or a synchronization signal reference signal received quality (SS-RSRQ) measurement.

Aspect 8: The method of one or more of Aspects 2-7, wherein the one or more mobility reference signal measurements are for at least one of: intra-frequency mobility measurement, or inter-frequency mobility measurement.

Aspect 9: The method of one or more of Aspects 2-8, wherein at least one of the one or more first symbols or the one or more second symbols are configured for at least one of: time division duplexing (TDD), or frequency division duplexing (FDD).

Aspect 10: The method of one or more of Aspects 2-9, wherein the one or more reference signal measurements are associated with a synchronization signal block (SSB) for radio link monitoring (RLM).

Aspect 11: The method of one or more of Aspects 2-10, wherein the one or more reference signal measurements are associated with a radio link monitoring reference signal (RLM-RS).

Aspect 12: The method of one or more of Aspects 2-11, wherein the one or more reference signal measurements are associated with a synchronization signal block (SSB) for beam failure detection (BFD).

Aspect 13: The method of one or more of Aspects 2-12, wherein the one or more reference signal measurements are associated with a beam failure detection (BFD) reference signal (BFD-RS).

Aspect 14: The method of one or more of Aspects 2-13, wherein the one or more reference signal measurements are for candidate beam detection.

Aspect 15: The method of one or more of Aspects 2-14, wherein the one or more reference signal measurements are associated with one or more synchronization signal block (SSB) indexes for radio link monitoring (RLM).

Aspect 16: The method of one or more of Aspects 2-15, wherein the one or more reference signal measurements are associated with at least one of: a periodic channel state information reference signal (CSI-RS) for layer 1 reference signal received power (L1-RSRP) measurement, a semi-periodic CSI-RS for L1-RSRP measurement, an aperiodic CSI-RS for L1-RSRP measurement, or a synchronization signal block (SSB) for L1-RSRP measurement.

Aspect 17: The method of one or more of Aspects 2-16, wherein the one or more reference signal measurements are associated with at least one of: a synchronization signal block (SSB) for layer 1 signal-to-interference-plus-noise ratio (L1-SINR) measurement, or a periodic channel state information reference signal (CSI-RS) for L1-SINR measurement.

Aspect 18: The method of one or more of Aspects 2-17, wherein the one or more second symbols occur in a synchronization symbol block measurement timing configuration (SMTC) window duration.

Aspect 19: The method of Aspect 18, wherein the one or more second symbols include a plurality of consecutive symbols, in the SMTC window duration, in which the one or more mobility reference signal measurements are to be performed; and wherein the one or more multiplexing restriction parameters include a third multiplexing restriction parameter for restricting transmission or reception of the uplink transmission in at least one of: a first symbol, in the SMTC window duration, prior to the plurality of consecutive symbols, or a second symbol, in the SMTC window duration, after the plurality of consecutive symbols.

Aspect 20: The method of Aspect 19, wherein the one or more mobility reference signal measurements comprise at least one of: a synchronization signal block (SSB) measurement, or a received signal strength indicator (RSSI) measurement.

Aspect 21: The method of one or more of Aspects 18-20, wherein the one or more second symbols include all symbols in the SMTC window duration.

Aspect 22: The method of one or more of Aspects 1-21, wherein the one or more multiplexing restriction parameters comprise at least one of: a multiplexing restriction parameter for restricting transmission or reception of an uplink transmission in a symbol in which the wireless communication device is to receive a synchronization signal block (SSB), a multiplexing restriction parameter for restricting transmission or reception of a downlink transmission in a symbol in which the wireless communication device is to transmit a random access channel (RACH) occasion, a multiplexing restriction parameter for restricting transmission or reception of an uplink transmission in a symbol in which the wireless communication device is to receive a master information block (MIB), a multiplexing restriction parameter for restricting transmission or reception of an uplink transmission in a radio resource control (RRC) configured downlink symbol, a multiplexing restriction parameter for restricting transmission or reception of an uplink transmission in an RRC configured uplink symbol, a multiplexing restriction parameter for restricting transmission or reception of an uplink transmission and reception of a downlink communication in an RRC configured flexible symbol for which no slot format indicator (SFI) is received, a multiplexing restriction parameter for restricting transmission or reception of a downlink dynamic grant for a symbol that is assigned an uplink SFI (SFI-U), a multiplexing restriction parameter for restricting transmission or reception of an uplink dynamic grant for a symbol that is assigned a downlink SFI (SFI-D), a multiplexing restriction parameter for canceling a configured uplink transmission in a symbol that is assigned an SFI-D or a flexible SFI (SFI-F), a multiplexing restriction parameter for canceling a configured downlink transmission in a symbol that is assigned an SFI-U or an SFI-F, a multiplexing restriction parameter for canceling a configured downlink transmission in a symbol for which an uplink dynamic grant is received, or a multiplexing restriction parameter for canceling a configured uplink transmission in a symbol for which a downlink dynamic grant is received.

Aspect 23: The method of one or more of Aspects 1-22, wherein the wireless communication device comprises a user equipment (UE); and wherein communicating in the full duplex communication mode comprises at least one of: forwarding communications between another UE and a base station as a relay UE in the full duplex communication mode, communicating with a single base station in the full duplex communication mode, or communicating with a plurality of base stations in the full duplex communication mode.

Aspect 24: The method of one or more of Aspects 1-23, wherein the wireless communication device comprises a base station; and wherein communicating in the full duplex communication mode comprises at least one of: communicating with a single user equipment (UE) in the full duplex communication mode, where the UE also communicates in the full duplex communication mode, or communicating with a plurality of UEs in the full duplex communication mode.

Aspect 25: The method of one or more of Aspects 1-24, wherein the one or more multiplexing restriction parameters are specific to a particular beam pair including an uplink beam and a downlink beam.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   identifying one or more multiplexing restriction parameters for communication in a wireless network;
   determining to ignore the one or more multiplexing restriction parameters for full duplex communication in the wireless network; and
   communicating in a full duplex communication mode based at least in part on the determination to ignore the one or more multiplexing restriction parameters.

2. The method of claim 1, wherein the one or more multiplexing restriction parameters include at least one of:
   one or more first multiplexing restriction parameters for restricting transmission or reception of an uplink transmission in one or more first symbols in which the wireless communication device is to perform one or more reference signal measurements, or
   one or more second multiplexing restriction parameters for restricting transmission or reception of the uplink transmission in one or more second symbols in which the wireless communication device is to perform one or more mobility reference signal measurements.

3. The method of claim 2, wherein the uplink transmission includes at least one of:
   a physical uplink control channel (PUCCH) transmission,
   a physical uplink shared channel (PUSCH) transmission, or
   a sounding reference signal (SRS) transmission.

4. The method of claim 2, wherein the uplink transmission and a reference signal associated with the one or more reference signal measurements are associated with at least one of:
   a frequency range 1 (FR1) frequency range,
   a frequency range 2 (FR2) frequency range,
   a frequency range 3 (FR3) frequency range,
   a frequency range 4 (FR4) frequency range, or
   a frequency range 5 (FR5) frequency range.

5. The method of claim 2, wherein the uplink transmission and a reference signal associated with the one or more reference signal measurements have same or different subcarrier spacing (SCS).

6. The method of claim 2, wherein the uplink transmission and a reference signal associated with the one or more reference signal measurements are associated with same or different component carriers (CCs).

7. The method of claim 2, wherein the one or more mobility reference signal measurements include at least one of:
   a synchronization signal reference signal received power (SS-RSRP) measurement,
   a synchronization signal signal-to-interference-plus-noise ratio (SS-SINK) measurement, or
   a synchronization signal reference signal received quality (SS-RSRQ) measurement.

8. The method of claim 2, wherein the one or more mobility reference signal measurements are for at least one of:
   intra-frequency mobility measurement, or
   inter-frequency mobility measurement.

9. The method of claim 2, wherein at least one of the one or more first symbols or the one or more second symbols are configured for at least one of:
   time division duplexing (TDD), or
   frequency division duplexing (FDD).

10. The method of claim 2, wherein the one or more reference signal measurements are associated with a synchronization signal block (SSB) for radio link monitoring (RLM).

11. The method of claim 2, wherein the one or more reference signal measurements are associated with a radio link monitoring reference signal (RLM-RS).

12. The method of claim 2, wherein the one or more reference signal measurements are associated with a synchronization signal block (SSB) for beam failure detection (BFD).

13. The method of claim 2, wherein the one or more reference signal measurements are associated with a beam failure detection (BFD) reference signal (BFD-RS).

14. The method of claim 2, wherein the one or more reference signal measurements are for candidate beam detection.

15. The method of claim 2, wherein the one or more reference signal measurements are associated with one or more synchronization signal block (SSB) indexes for radio link monitoring (RLM).

16. The method of claim 2, wherein the one or more reference signal measurements are associated with at least one of:
- a periodic channel state information reference signal (CSI-RS) for layer 1 reference signal received power (L1-RSRP) measurement,
- a semi-periodic CSI-RS for L1-RSRP measurement,
- an aperiodic CSI-RS for L1-RSRP measurement, or
- a synchronization signal block (SSB) for L1-RSRP measurement.

17. The method of claim 2, wherein the one or more reference signal measurements are associated with at least one of:
- a synchronization signal block (SSB) for layer 1 signal-to-interference-plus-noise ratio (L1-SINR) measurement, or
- a periodic channel state information reference signal (CSI-RS) for L1-SINR measurement.

18. The method of claim 2, wherein the one or more second symbols occur in a synchronization symbol block measurement timing configuration (SMTC) window duration.

19. The method of claim 18, wherein the one or more second symbols include a plurality of consecutive symbols, in the SMTC window duration, in which the one or more mobility reference signal measurements are to be performed; and
wherein the one or more multiplexing restriction parameters include a third multiplexing restriction parameter for restricting transmission or reception of the uplink transmission in at least one of:
- a first symbol, in the SMTC window duration, prior to the plurality of consecutive symbols, or
- a second symbol, in the SMTC window duration, after the plurality of consecutive symbols.

20. The method of claim 19, wherein the one or more mobility reference signal measurements comprise at least one of:
- a synchronization signal block (SSB) measurement, or
- a received signal strength indicator (RSSI) measurement.

21. The method of claim 18, wherein the one or more second symbols include all symbols in the SMTC window duration.

22. The method of claim 1, wherein the one or more multiplexing restriction parameters comprise at least one of:
- a multiplexing restriction parameter for restricting transmission or reception of an uplink transmission in a symbol in which the wireless communication device is to receive a synchronization signal block (SSB),
- a multiplexing restriction parameter for restricting transmission or reception of a downlink transmission in a symbol in which the wireless communication device is to transmit a random access channel (RACH) occasion,
- a multiplexing restriction parameter for restricting transmission or reception of an uplink transmission in a symbol in which the wireless communication device is to receive a master information block (MIB),
- a multiplexing restriction parameter for restricting transmission or reception of an uplink transmission in a radio resource control (RRC) configured downlink symbol,
- a multiplexing restriction parameter for restricting transmission or reception of an uplink transmission in an RRC configured downlink symbol,
- a multiplexing restriction parameter for restricting transmission or reception of an uplink transmission and reception of a downlink communication in an RRC configured flexible symbol for which no slot format indicator (SFI) is received,
- a multiplexing restriction parameter for restricting transmission or reception of a downlink dynamic grant for a symbol that is assigned an uplink SFI (SFI-U),
- a multiplexing restriction parameter for restricting transmission or reception of an uplink dynamic grant for a symbol that is assigned a downlink SFI (SFI-D),
- a multiplexing restriction parameter for canceling a configured uplink transmission in a symbol that is assigned an SFI-D or a flexible SFI (SFI-F),
- a multiplexing restriction parameter for canceling a configured downlink transmission in a symbol that is assigned an SFI-U or an SFI-F,
- a multiplexing restriction parameter for canceling a configured downlink transmission in a symbol for which an uplink dynamic grant is received, or
- a multiplexing restriction parameter for canceling a configured uplink transmission in a symbol for which a downlink dynamic grant is received.

23. The method of claim 1, wherein the wireless communication device comprises a user equipment (UE); and
wherein communicating in the full duplex communication mode comprises at least one of:
- forwarding communications between another UE and a base station as a relay UE in the full duplex communication mode,
- communicating with a single base station in the full duplex communication mode, or
- communicating with a plurality of base stations in the full duplex communication mode.

24. The method of claim 1, wherein the wireless communication device comprises a base station; and
wherein communicating in the full duplex communication mode comprises at least one of:
- communicating with a single user equipment (UE) in the full duplex communication mode, where the UE also communicates in the full duplex communication mode, or
- communicating with a plurality of UEs in the full duplex communication mode.

25. The method of claim 1, wherein the one or more multiplexing restriction parameters are specific to a particular beam pair including an uplink beam and a downlink beam.

26. A wireless communication device for wireless communication, comprising:
a memory; and
one or more processors, coupled to the memory, configured to:
identify one or more multiplexing restriction parameters for communication in a wireless network;
determine to ignore the one or more multiplexing restriction parameters for full duplex communication in the wireless network; and communicate in a full duplex communication mode based at least in part on the determination to ignore the one or more multiplexing restriction parameters.

27. The wireless communication device of claim 26, wherein the one or more multiplexing restriction parameters include at least one of:
one or more first multiplexing restriction parameters for restricting transmission or reception of an uplink transmission in one or more first symbols in which the wireless communication device is to perform one or more reference signal measurements, or
one or more second multiplexing restriction parameters for restricting transmission or reception of the uplink transmission in one or more second symbols in which the wireless communication device is to perform one or more mobility reference signal measurements.

28. A non-transitory computer-readable medium storing a set of instructions for wireless communication, the set of instructions comprising:
one or more instructions that, when executed by one or more processors of a wireless communication device, cause the wireless communication device to:
identify one or more multiplexing restriction parameters for communication in a wireless network;
determine to ignore the one or more multiplexing restriction parameters for full duplex communication in the wireless network; and
communicate in a full duplex communication mode based at least in part on the determination to ignore the one or more multiplexing restriction parameters.

29. The non-transitory computer-readable medium of claim 28, wherein the one or more multiplexing restriction parameters include at least one of:
one or more first multiplexing restriction parameters for restricting transmission or reception of an uplink transmission in one or more first symbols in which the wireless communication device is to perform one or more reference signal measurements, or
one or more second multiplexing restriction parameters for restricting transmission or reception of the uplink transmission in one or more second symbols in which the wireless communication device is to perform one or more mobility reference signal measurements.

30. An apparatus for wireless communication, comprising:
means for identifying one or more multiplexing restriction parameters for communication in a wireless network;
means for determining to ignore the one or more multiplexing restriction parameters for full duplex communication in the wireless network; and
means for communicating in a full duplex communication mode based at least in part on the determination to ignore the one or more multiplexing restriction parameters.

* * * * *